UNITED STATES PATENT OFFICE.

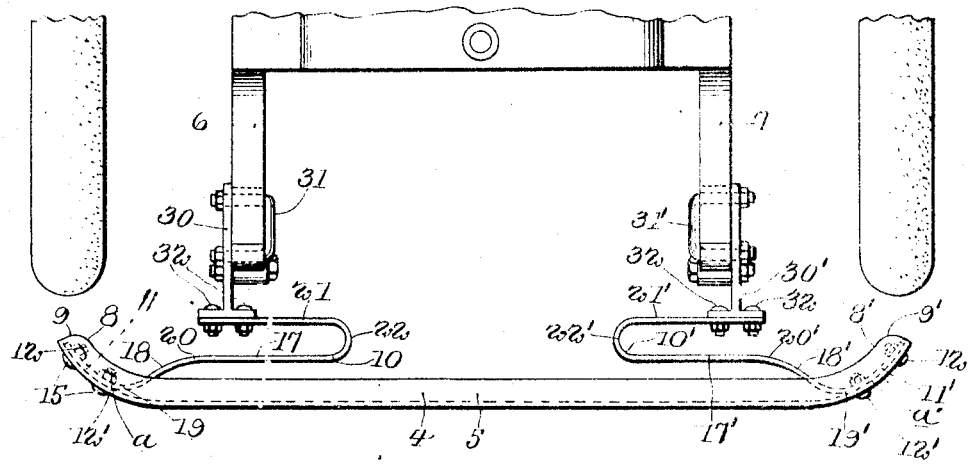

WILLIS McKEE, OF ELYRIA, OHIO, ASSIGNOR TO THE ELYRIA IRON & STEEL COMPANY, OF CLEVELAND, OHIO, A CORPORATION OF OHIO.

FENDER-BAR FOR AUTOMOBILES AND THE LIKE.

1,321,655.  Specification of Letters Patent.  Patented Nov. 11, 1919.

Application filed February 13, 1917. Serial No. 148,369.

*To all whom it may concern:*

Be it known that I, WILLIS MCKEE, a citizen of the United States, residing at Elyria, in the county of Lorain and State of Ohio, have invented certain new and useful Improvements in Fender-Bars for Automobiles and the like; and I do hereby declare the following to be a full, clear, and exact description of the invention, such as will enable others skilled in the art to which it appertains to make and use the same.

My invention relates to improvements in fenders for automobiles and the like and has for its principal object increasing the efficiency of such devices and simplifying and cheapening the manufacture thereof. I also aim to effect the protection of the machine using my fender bar in a better and more efficient way.

These and other objects of my invention, as well as the invention itself and the manner in which the objects are realized, will be better understood from a description of an embodiment thereof.

Figure 1 is a view in top plan of an embodiment of my invention attached to the front end of an automobile frame.

Fig. 2 is a side elevation of a portion of the frame of an automobile illustrating one manner in which a fender bar may be connected to an automobile.

Fig. 3 is a sectional detail illustrating the manner of connecting the spring member to the bumper bar.

Referring now to the drawings and to the embodiment of my invention illustrated therein, at 4 is shown the bumper bar, which is preferably made of a piece of channel iron, of some suitable cross-section, one form of which is illustrated in Fig. 3 of the drawing. Compared to the springs to be described, the bumper bar is relatively rigid, but should be made sufficiently resilient to permit a certain degree of bending when comparatively severe blows are struck upon it. I prefer to make the bar of relatively high carbon steel, as one manner of realizing this result. The central portion 5 of the bar should be made straight, so as to extend, when in use, perpendicular to the long axis and the general direction of the frame members of the vehicle upon which it is employed. In the embodiment shown, this straight central portion of the bar constitutes the major part of the bar and extends across in front of the frame members 6 and 7 of the automobile.

The ends 8 and 8' of the bar may be turned slightly backward and curved to a suitable degree. I prefer to cut off the back corners of the channel sides as illustrated at 9 and 9'. The spring members are shown at 10 and 10' and are made from flat strip resilient material, such as steel. These spring members are intended to yieldingly resist blows of moderate force when such are received by the fender bar, no matter whether upon one side or in the center; the work done in bending the springs absorbing the force of said blows and protecting not only the machine to which the fender is connected, but, in the case of most blows, preserving itself so that it will return to normal when the pressure is released, or, if the blow has been so severe as to permanently bend the springs, they may be readily restored to normal without material difficulty or expense.

The springs are of U shape, as far as the main body part is concerned, but one prong of the U-shaped spring extends beyond the other at a diverging angle to form link portions 18, 18'. The extension then bends backward to form a reverse loop portion, the end of the extension being fastened to the end of the fender bar, as shown.

The force applied to the bar must both bend back the reversed loop portion of the stiff spring and compress the loop portion adjacent the vehicle frame before the bar falls back upon the frame. I prefer to so construct the parts that the reversed loop portion is first bent, since its resistance will be sufficient to overcome the force of many blows to which the device is subjected, and it will of its own accord, return to normal when the pressure is removed. When harder blows are delivered, the loop adjacent the frame will be compressed, but may, if it does not return to normal itself, readily and quickly be extended, by the car driver or other person, to the position illustrated. I thus produce what might be called a self-preserving fender, at the same time producing a highly efficient, sightly and cheaply made article.

The springs are thus provided with substantially flat hands 11 and 11' (forming bar attaching portions), each having the curvature of the end portions of the bar to which it is connected by suitable means, such as bolts 12, 12' extending through perforations 14 in the hands and 13 in the bar. It will be understood that any suitable connecting means may be used to connect the springs to the bumper bar, though I prefer to use bolts, the round heads 15 thereof making a pleasing appearance on the front of the bar. The flat, smooth under surface of the hand fits closely against the bottom 16 of the channeled bar and may be drawn tightly thereagainst by the bolts. When thus connected, the hands and bars engage throughout considerable area, distributing the pressure transmitted from the bar to the spring, preventing localization of such pressure and avoiding distortion of the springs there.

The central portions 17 and 17' of the springs extend substantially parallel to the central part of the bar and toward each other. The springs are provided with links 18 and 18' connecting the hands 11 and 11' with the central portions 17 and 17' thereof. The links 18 and 18' extend in a direction at an angle to both the central portion of the bar and of the springs, preferably at an angle of about 45°, and are curved reversely at the points of connection 19, 19' and 20, 20' with the hands and the central portions, respectively.

The springs are provided with attaching end portions 21, 21', corresponding in the embodiment shown to the upper prongs of the letter S, preferably extending substantially parallel to the central portion of the bar and the central portion of the springs 17 and 17', but in the reverse direction, the springs having been doubled back upon themselves. The central portions of the springs 17 and 17' and the end attaching portions or prongs 21 and 21' are connected by loops 22 and 22', which in the embodiment shown are U-shaped and integral with the other parts of the springs. In fact, I prefer to make all of the portions of the springs which I have described integral, so that each spring from hand to attaching portion is an integral strip metal member. Suitable mechanism is provided for connecting the end attaching portions of the spring to the frame of the vehicle, preferably to the side frame members 6 and 7. I contemplate for such purpose the use of any suitable mechanism. In the embodiment shown side members 30 and 30' are used connected to the frame members 6 and 7 by loops 31 and 31' and to the spring attaching ends 21, 21' by any suitable means, such as bolts 32.

It is better to make the bar and all portions of the springs in the same horizontal plane, as illustrated in the drawing, that the force of the blows may be brought to the springs without twisting strain upon the same or any part thereof.

It will readily be seen that all the parts of this fender may be cheaply and easily constructed by the use of standard machinery in standard operations and assembled with little or no difficulty. The fender is compact, sightly, simple and comparatively light in weight. If the central portion of the fender bar is struck, each of the springs will resistingly yield to the blow until they have been compressed, when the central portion of the bar will yield further, the whole structure falling back upon the frame of the automobile, which, in the case of many severe blows, will be able to absorb, without injury, the force of the blow remaining after the injurious part thereof has been absorbed by the springs and bar of the fender.

In case the blow comes at one end of the fender bar, the spring on the side to which the blow is delivered will act in much the same manner as if the blow had been delivered at the center, resisting the force of the blow, and the spring on the other end will be extended, likewise resisting the force of the blow. If the force of the blow has not been entirely overcome in doing the work of thus compressing and extending the springs, the bar will yield before the remaining force of the blow reaches the frame. In any case, the apparatus constituting the fender bar retires upon the frame in such a manner that the blow will not destroy the apparatus, the arrangement of the parts and the curvatures of the springs being such that the springs cannot be destroyed or materially injured by any blows which are ordinarily received by automobiles, against which fender bars furnish any protection.

I have also produced a compact device which does not extend unduly from the vehicle upon which it is used. This last named result is largely contributed to by the system I have employed in the embodiment illustrated, of extending the ends of the bar and springs parallel to each other where they are connected together.

I have shown this embodiment of my invention and the details thereof for the purpose of better describing the invention. It will readily be understood by those skilled in the art that many departures may be made from both the form and the details without departing from the spirit of the invention, the scope of which is well illustrated in the appended claims.

I claim :—

1. In a fender for automobiles or the like, the combination of a channel bar and a spring shaped like the letter U, with one prong diverging outwardly and then bending backwardly to form a reverse loop with the free end parallel to a portion of the channel bar, means to attach such spring end to the fender bar and mechanism to connect the other end of the spring to a portion of a vehicle.

2. In a fender for automobiles or the like, the combination of a channel fender bar, a pair of springs separate from said bar, each having a bar end attaching portion connected flat against one end of said bar, a central portion substantially parallel to the central portion of the bar, a reversely curved link connecting the bar end attaching portion and the central portion and means out of alinement with said bar attaching portions to connect the springs to a vehicle frame.

3. In a fender for automobiles and the like, the combination of a stiff fender bar, a pair of U-shaped springs each with an extension on one prong diverging outwardly and then backwardly in a reverse direction to form ends to fit the end of said fender bar, the surface of such portion of the spring and bar being in engagement and attached together and mechanism to connect the other prong of the spring to the vehicle.

4. In a fender for automobiles and the like, the combination of a fender bar, a pair of U-shaped springs each with an extension on one prong diverging outwardly and then bending inwardly in a reverse direction to extend along the inner surface of the bar and attached thereto, all parts of said springs and said bar being in the same horizontal plane when the device is in use and mechanism to connect the other prongs of said springs to a vehicle.

5. In a fender for automobiles or the like, the combination of a slightly resilient though comparatively rigid channel bar having a straight central portion and a pair of curved end portions slightly bent backward from the central portion, a pair of flat resilient plate springs, each having a hand portion on one end, such hand portions being slightly curved to conform to the curvature of the ends of the fender bar and when in position, fitting flatly against the inside of the back thereof, the ends of the bar and said hands being each perforated, means for connecting said hands to said bar ends extending through said perforations, central spring portions extending toward each other substantially parallel to the central portion of the bar, links connecting the spring hands and the spring central portions extending at substantially 45° to the central part of the fender bar integral with said spring hands and spring attaching portions and curved at the junction points therewith, spring end attaching portions extending substantially parallel to the central portion of the fender bar and to the central spring portions, substantially uniformly curved links integral with the spring attaching portions and the spring central portions, said end attaching portions extending from said links toward opposite ends of the fender bar and mechanism for attaching the spring end attaching portions to the vehicle.

In witness whereof I have hereunto signed my name this 6th day of February, 1917.

WILLIS McKEE.